(12) United States Patent
Lee et al.

(10) Patent No.: US 11,707,717 B2
(45) Date of Patent: Jul. 25, 2023

(54) SEPARATOR LEAF, AND SPIRAL WOUND MODULE AND DEVICE COMPRISING SAME

(71) Applicant: LG CHEM, LTD., Seoul (KR)

(72) Inventors: Phill Lee, Daejeon (KR); Yun Seok Choe, Daejeon (KR); Gwang Hun Choi, Daejeon (KR); Soo Hyun Kim, Daejeon (KR); Dong Hyeok Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 177 days.

(21) Appl. No.: 17/051,580

(22) PCT Filed: Jul. 24, 2019

(86) PCT No.: PCT/KR2019/009171
§ 371 (c)(1),
(2) Date: Oct. 29, 2020

(87) PCT Pub. No.: WO2020/022773
PCT Pub. Date: Jan. 30, 2020

(65) Prior Publication Data
US 2021/0086137 A1   Mar. 25, 2021

(30) Foreign Application Priority Data

Jul. 27, 2018 (KR) .................. 10-2018-0087819

(51) Int. Cl.
*B01D 63/10* (2006.01)
*B01D 53/22* (2006.01)
(Continued)

(52) U.S. Cl.
CPC .......... *B01D 63/10* (2013.01); *B01D 53/228* (2013.01); *B01D 61/08* (2013.01); *B01D 63/103* (2013.01); *B01D 61/10* (2013.01); *B01D 2313/146* (2013.01); *B01D 2325/04* (2013.01); *C02F 1/44* (2013.01); *C02F 1/441* (2013.01)

(58) Field of Classification Search
CPC ...... B01D 63/10; B01D 53/228; B01D 61/08; B01D 61/10; B01D 2313/146;
(Continued)

(56) References Cited

U.S. PATENT DOCUMENTS 6,656,362 B1   12/2003   Kihara et al.
9,636,637 B2   5/2017   Earhart et al.
(Continued)

FOREIGN PATENT DOCUMENTS

CN           1533825      10/2004
CN         204485664       7/2015
(Continued)

OTHER PUBLICATIONS

Roh et al., "Effects of the Polyamide Molecular Structure on the Performance of Reverse Osmosis Membranes," J. Polymer Science: Part B: Polymer Physics 36: 1821-1830 (1998).

*Primary Examiner* — Akash K Varma
(74) *Attorney, Agent, or Firm* — Dentons US LLP

(57) ABSTRACT

Provided is a separation membrane leaf and a spiral wound module and an apparatus including the same, the separation membrane leaf comprising a separator, a supply-side flow channel material, and a permeation-side flow channel material comprising a tricot, the tricot comprising an adhesive part, and at least a part of the adhesive part being a low density part of the tricot, compared to the rest, wherein the tricot comprises at least one wale, at least one course, and an intersection point at which the at least one wale and the at least one course intersect, and the average distance between two intersection points arranged in parallel in the direction in which the wale of the low-density part is arranged is at least 1.25 times the average distance between two intersection points arranged in parallel in the direction in which the wale of the part other than the low-density part is arranged.

8 Claims, 8 Drawing Sheets

(51) Int. Cl.
*B01D 61/08* (2006.01)
*B01D 61/10* (2006.01)
*C02F 1/44* (2023.01)

(58) Field of Classification Search
CPC ..... B01D 2325/04; B01D 63/103; C02F 1/44; C02F 1/441
USPC ........................................................ 210/348
See application file for complete search history.

(56) References Cited

U.S. PATENT DOCUMENTS

| | | |
|---|---|---|
| 10,583,400 B2 | 3/2020 | Shrikhande et al. |
| 2004/0182775 A1 | 9/2004 | Hirokawa et al. |
| 2009/0050558 A1 | 2/2009 | Ishizuka et al. |
| 2013/0098831 A1 | 4/2013 | Shrikhande et al. |
| 2017/0056829 A1 | 3/2017 | Shrikhande et al. |
| 2017/0304775 A1 | 10/2017 | Yamaguchi et al. |
| 2019/0247794 A1 | 8/2019 | Nishi et al. |
| 2019/0255487 A1 | 8/2019 | Nishi et al. |

FOREIGN PATENT DOCUMENTS

| | | |
|---|---|---|
| CN | 106687201 A | 5/2017 |
| ES | 2353194 | 2/2011 |
| JP | 2015-006661 | 1/2015 |
| JP | 2018-047456 | 3/2018 |
| KR | 10-2006-0011043 | 2/2006 |
| KR | 10-2014-0092306 | 7/2014 |
| KR | 10-2016-0068612 | 6/2016 |
| KR | 10-2016-0076718 | 7/2016 |
| KR | 10-1966118 | 4/2019 |

[FIG. 1]
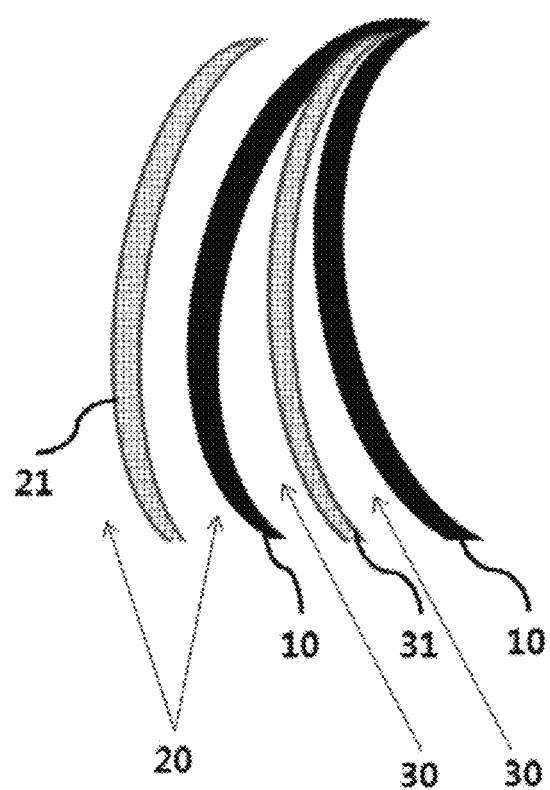

[FIG. 2]
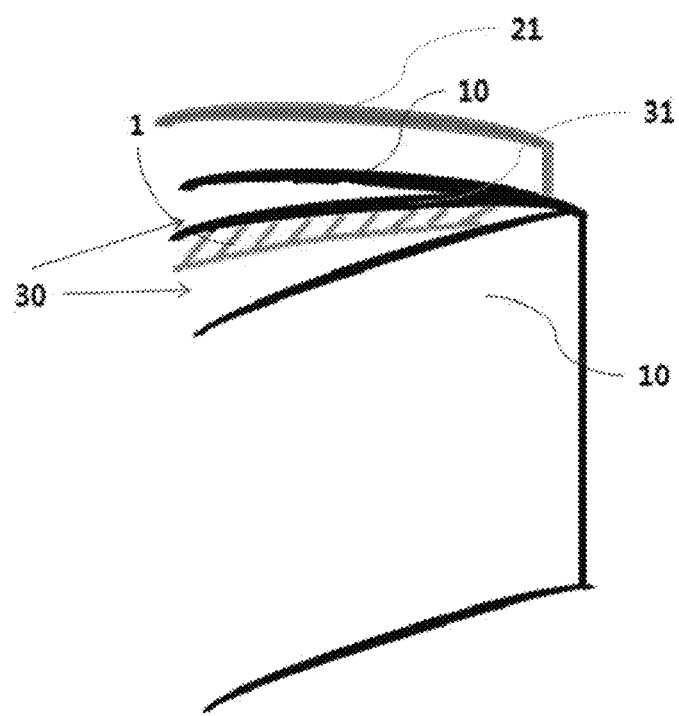

[FIG. 3]
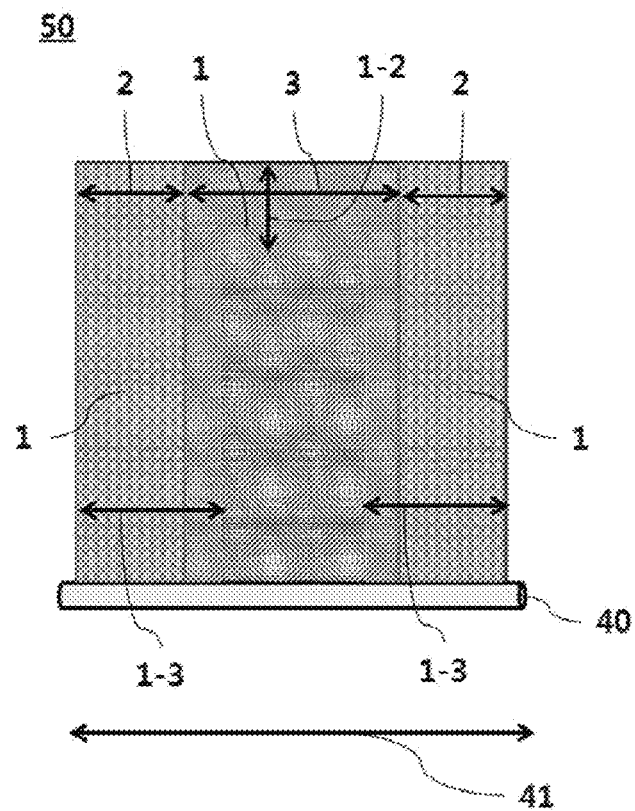
[FIG. 4]
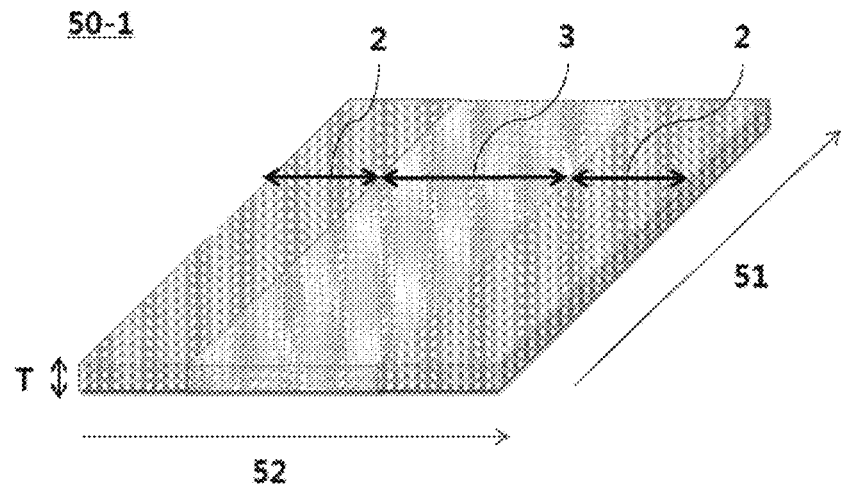

[FIG. 5] <Prior Art>
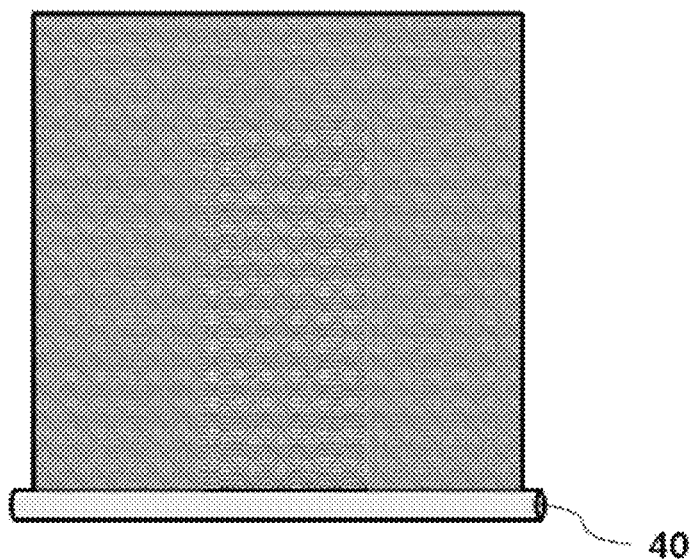
[FIG. 6]
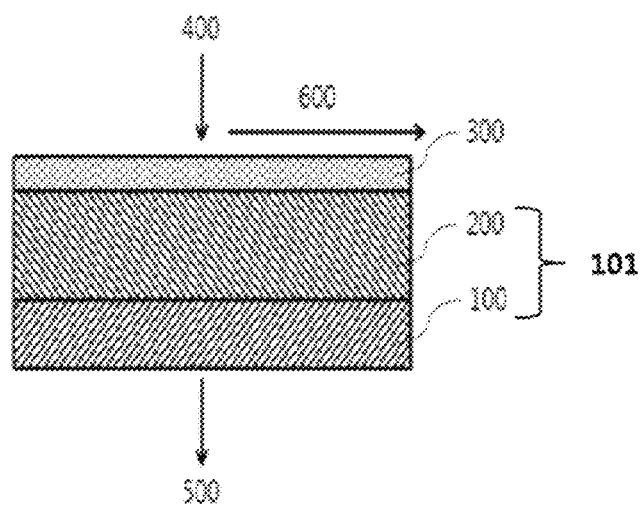

【FIG. 7】
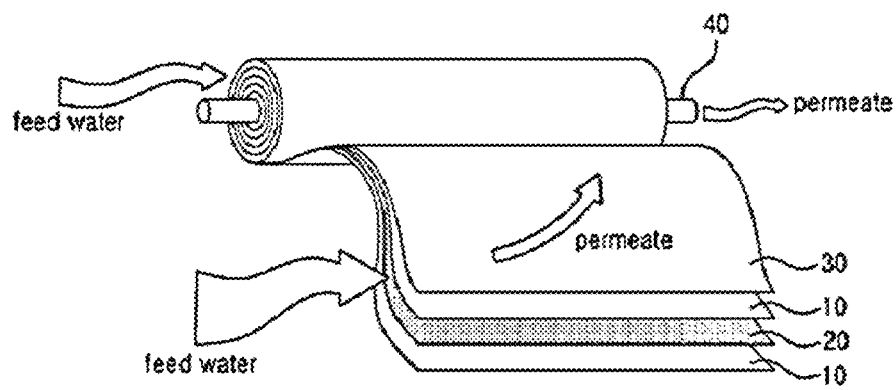
【FIG. 8】
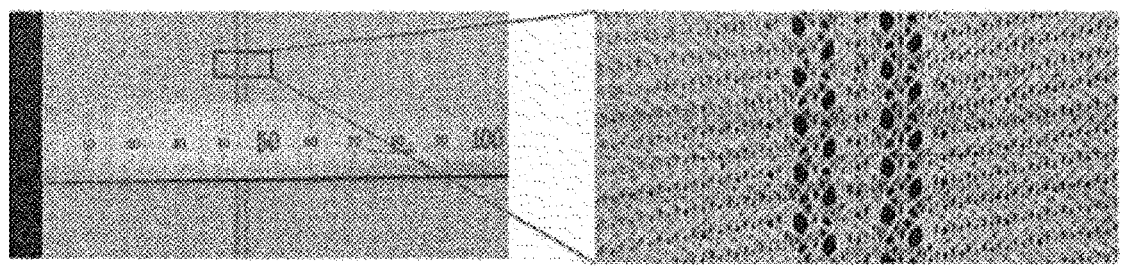
【FIG. 9】
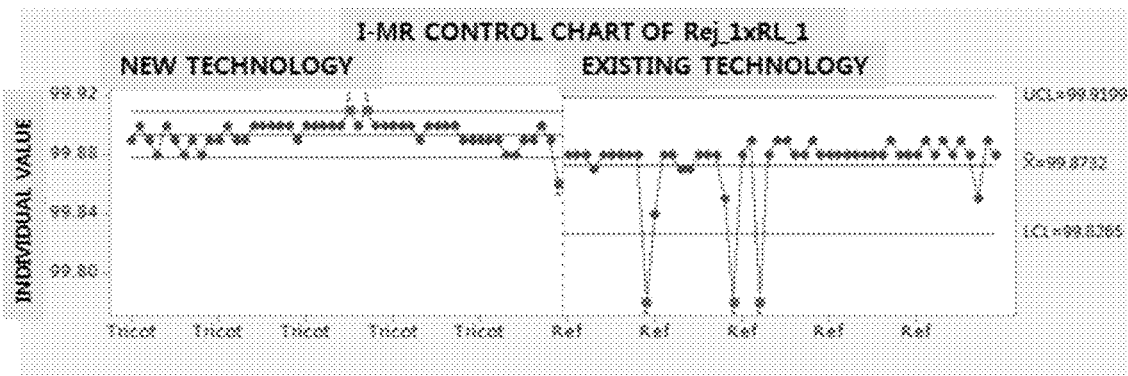

[FIG. 10]
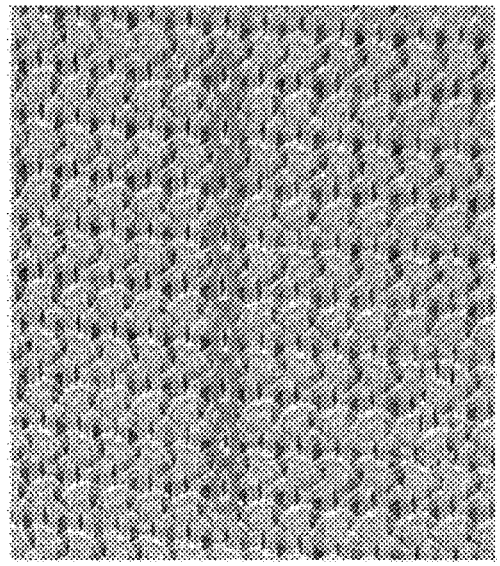
[FIG. 11]
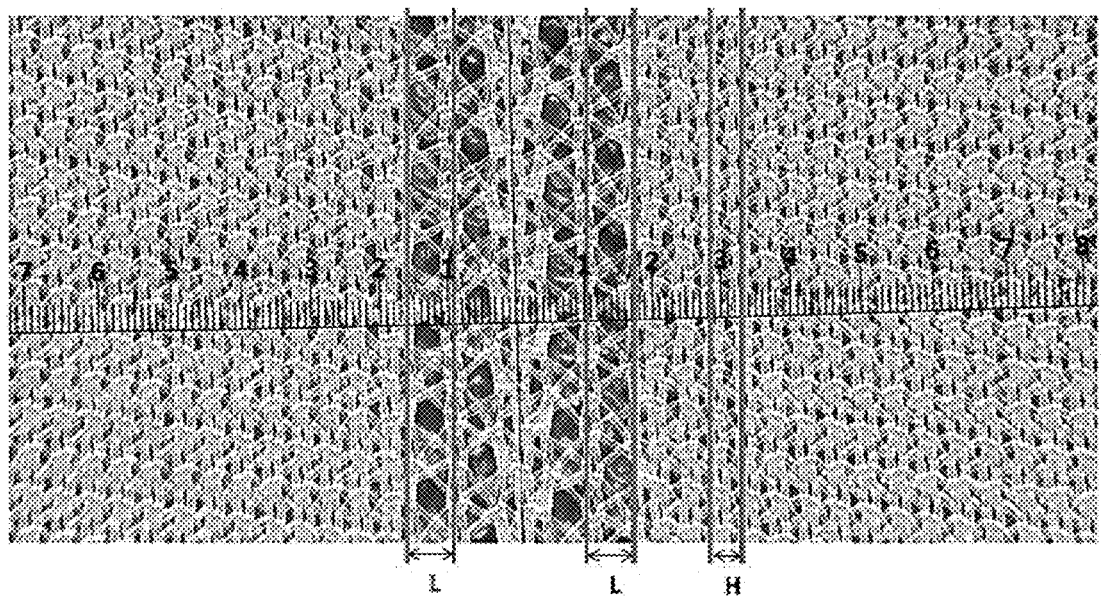

[FIG. 12]
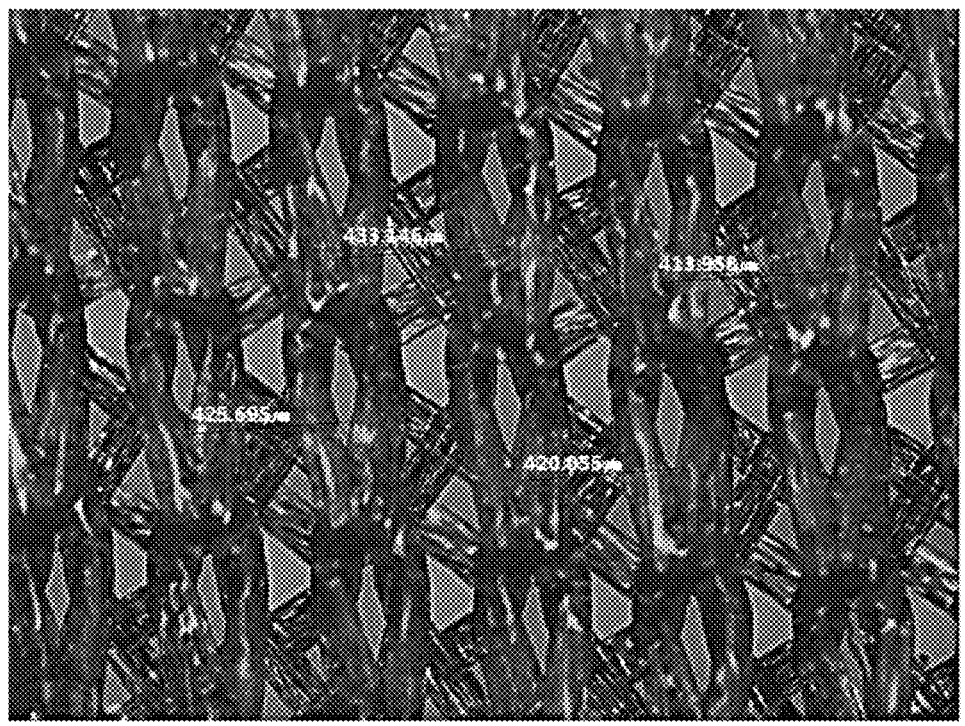
[FIG. 13]
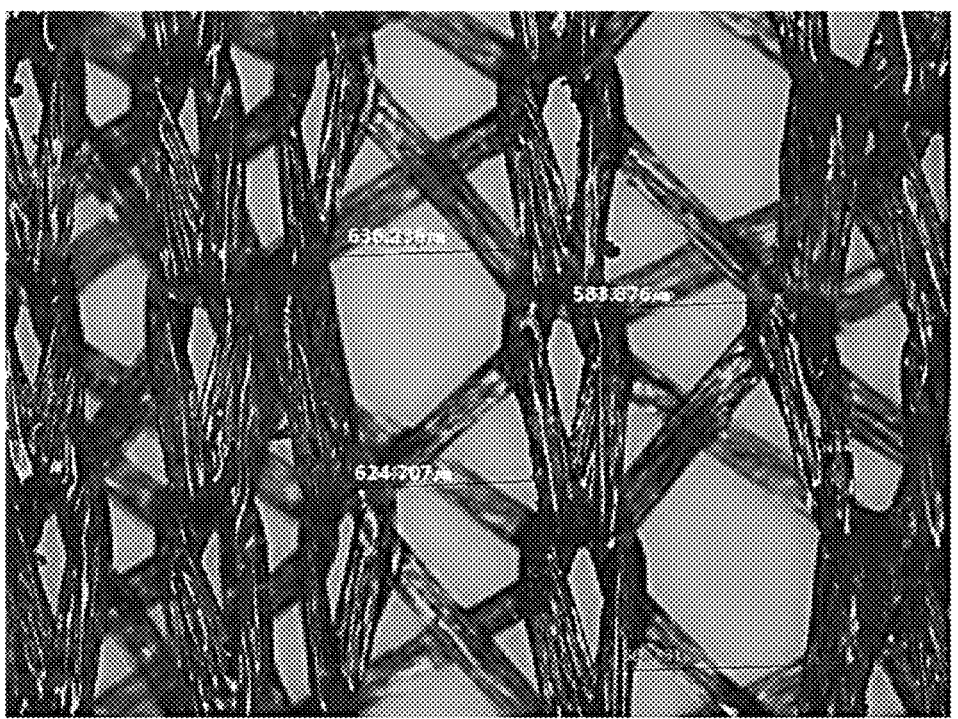

[FIG. 14]
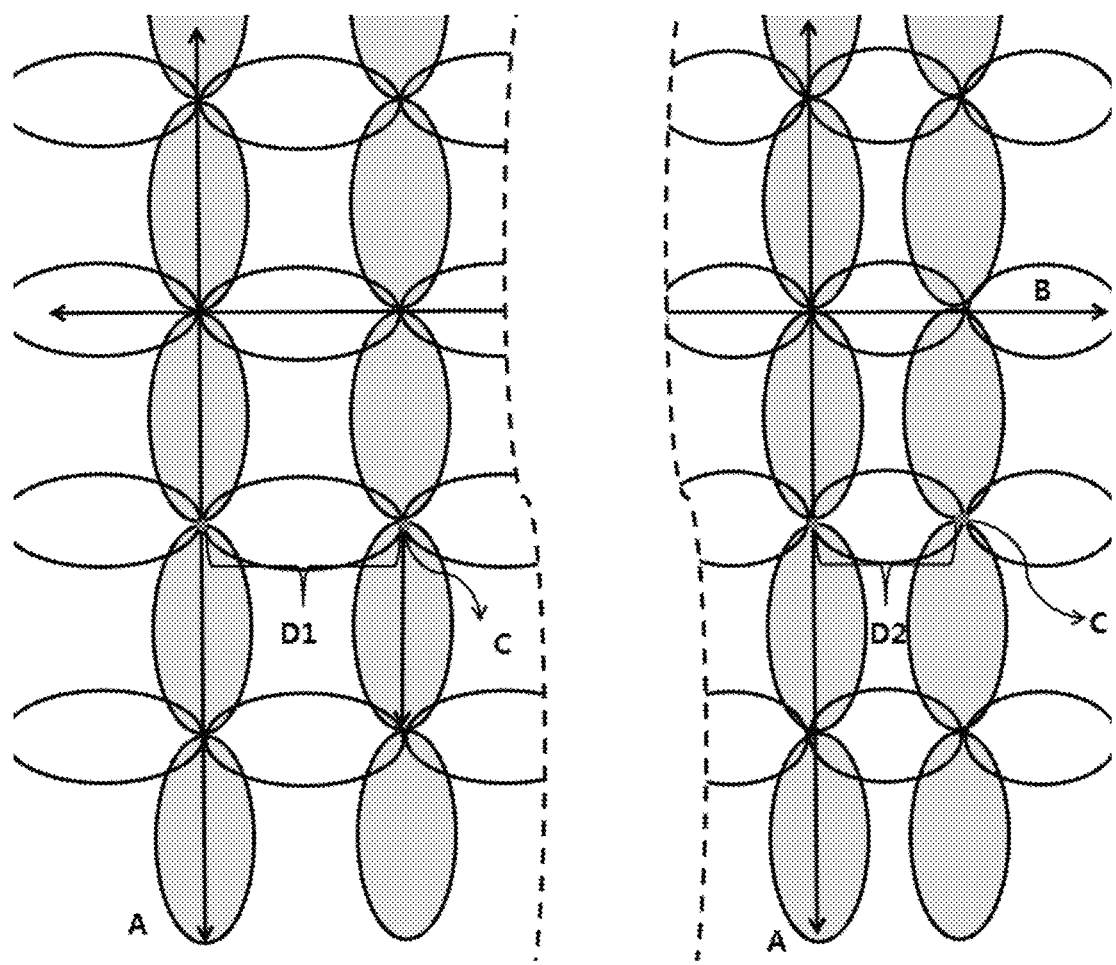

SEPARATOR LEAF, AND SPIRAL WOUND MODULE AND DEVICE COMPRISING SAME

CROSS-REFERENCE TO RELATED APPLICATIONS

This application is a National Stage Application of International Application No. PCT/KR2019/009171 filed on Jul. 24, 2019, which claims priority to and the benefits of Korean Patent Application No. 10-2018-0087819, filed with the Korean Intellectual Property Office on Jul. 27, 2018, the entire contents of which are incorporated herein by reference.

TECHNICAL FIELD

The present specification relates to a separation membrane leaf, and a spiral wound module and an apparatus including the same.

BACKGROUND ART

Separation membrane manufacturing and process technologies have been widely applied from simple laboratory scales to large scale industrial processes depending on manufacturing of high purity and high functional materials and social demands such as protecting the global environment.

Among these, water purification technology that is a technology for securing alternative water resources has received attention as water shortage resulting from global warming has become more serious worldwide. Accordingly, a water-treatment process using a reverse osmosis membrane, a core technology of next generation tap water business using alternative water resources such as seawater desalination or water reuse, is expected to lead the water industry market. Such reverse osmosis membrane permeated water by the reverse osmosis membrane becomes pure water or water close to infinitely pure water, and is used in various fields such as medical sterile water or purified water for dialysis, or water for manufacturing a semiconductor in the electronic industry.

In addition, a separation membrane has been widely used in the field of gas separation including hydrogen and oxygen.

DISCLOSURE

Technical Problem

The present specification is directed to providing a separation membrane leaf, and a spiral wound module and an apparatus including the same.

Technical Solution

One embodiment of the present specification provides a separation membrane leaf including a separation membrane, a supply-side flow path material and a permeation-side flow path material, wherein the permeation-side flow path material includes a tricot, the tricot includes an adhering portion, and at least a part of the adhering portion is a low-density portion of the tricot compared to the rest, the tricot includes one or more wales and one or more courses, the tricot includes an intersection at which any one of the wales and any one of the courses intersect, and an average distance between two intersections arranged in parallel in a direction of the wale of the low-density portion is arranged is 1.25 times or greater of an average distance between two intersections arranged in parallel in a direction of the wale of a part other than the low-density portion is arranged.

Another embodiment of the present specification provides a spiral wound module including the separation membrane leaf.

Another embodiment of the present specification provides an apparatus including one or more of the spiral wound modules.

Advantageous Effects

When using a separation membrane leaf according to one embodiment of the present specification in a spiral wound module, the spiral wound module can be stably manufactured. In addition, the spiral wound module has enhanced salt rejection performance.

DESCRIPTION OF DRAWINGS

FIG. 1 illustrates a separation membrane leaf according to one embodiment of the present specification.

FIG. 2 is a perspective view of the separation membrane leaf according to one embodiment of the present specification.

FIG. 3 illustrates a tricot according to one embodiment of the present specification.

FIG. 4 illustrates a tricot that does not include an adhering portion according to one embodiment of the present specification.

FIG. 5 illustrates a tricot according to a comparative example.

FIG. 6 illustrates a separation membrane according to one embodiment of the present specification.

FIG. 7 illustrates a spiral wound module according to one embodiment of the present specification.

FIG. 8 shows a sample picture of a tricot according to one embodiment of the present specification.

FIG. 9 is a graph showing an I-MR control chart of spiral wound modules according to an example and a comparative example.

FIG. 10 shows a sample picture of a tricot having constant density over the whole tricot area.

FIG. 11 shows a sample picture of a tricot including a low-density portion.

FIG. 12 shows a sample picture of a tricot according to one embodiment of the present specification measuring and describing a distance between two intersections arranged in parallel in a direction of the wale of a part other than a low-density portion of the tricot being arranged.

FIG. 13 shows a sample picture of a tricot according to one embodiment of the present specification measuring and describing a distance between two intersections arranged in parallel in a direction of the wale of a low-density portion of the tricot being arranged.

FIG. 14 illustrates a tricot according to one embodiment of the present specification.

DETAILED DESCRIPTION

In the present specification, a description of a certain member being placed "on" an other member includes not only a case of the certain member adjoining the other member but a case of still an other member being present between the two members.

In the present specification, a description of a certain part "including" certain constituents means capable of further including other constituents, and does not exclude other constituents unless particularly stated on the contrary.

In the present specification, a "leaf" means, as a constituent used in a separation membrane module, a constituent including a separation membrane, a flow path material, a tricot, a supply path and a permeation path.

Hereinafter, the present specification will be described in more detail.

One embodiment of the present specification provides a separation membrane leaf including a separation membrane, a supply-side flow path material and a permeation-side flow path material, wherein the permeation-side flow path material includes a tricot, the tricot includes an adhering portion, and at least a part of the adhering portion is a low-density portion of the tricot compared to the rest of the tricot, the tricot includes one or more wales and one or more courses, the tricot includes an intersection at which any one of the wales and any one of the courses intersect, and an average distance between two intersections arranged in parallel in a direction of the wale of the low-density portion is arranged is 1.25 times or greater of an average distance between two intersections arranged in parallel in a direction of the wale of a part other than the low-density portion is arranged.

Specifically, one embodiment of the present specification provides a separation membrane leaf including a separation membrane, a supply-side flow path material and a permeation-side flow path material, wherein a supply path is formed on one surface of the separation membrane, a permeation path is formed on the opposite surface facing the one surface of the separation membrane, the supply-side flow path material is located in the supply path, the permeation-side flow path material is located in the permeation path, the permeation-side flow path material includes a tricot, the tricot includes an adhering portion, and at least a part of the adhering portion is a low-density portion of the tricot compared to the rest of the tricot.

Another embodiment of the present specification provides a spiral wound module including the separation membrane leaf.

In order to prevent raw water inflowing through the supply path and produced water outflowing through the permeation path from being mixed when manufacturing the spiral wound module, an adhering portion can be provided in an edge portion of the separation membrane leaf included in the spiral wound module.

The "adhering portion" refers to a part where the tricot and the separation membrane included in the separation membrane leaf adhere, and as the adhering portion included in the tricot and the separation membrane have higher sealability, mixing of the raw water and the produced water can be efficiently blocked.

When forming the adhering portion, the adhesive may not favorably fill the space of the tricot, and this is due to the fact that bubbles introduced during a manufacturing process of the separation membrane leaf remain in the tricot space, or the adhesive generates gases by reacting with other materials and may remain in the tricot space. The tricot space can mean a loop or a stitch of a fabric forming the tricot.

In view of the above, the present disclosure includes a local region lowering weaving density of the tricot and, by having bubbles that can be generated in a manufacturing process of the separation membrane leaf disposed in the local region having low weaving density, sealability of the adhering portion can be enhanced by filling a part except the local region lowering weaving density with an adhesive.

Accordingly, the tricot-including separation membrane leaf according to one embodiment of the present specification can be stably manufactured, and when driving a spiral wound module including the separation membrane leaf, salt rejection performance can be enhanced.

In other words, the present disclosure is mainly intended to enhance salt rejection of the separation membrane leaf and the spiral wound module including the tricot by enhancing sealability of the tricot. This is different from a goal to enhance flux by decreasing a thickness of at least a part of the tricot and thereby increasing an active area of the separation membrane leaf.

The local region lowering weaving density means the "at least a part" in the present specification, and can mean a "low-density portion" of the tricot.

One embodiment of the present specification provides a separation membrane leaf, wherein the separation membrane is folded in half, a supply path is formed on an inner surface of the folded separation membrane, a permeation path is formed on an outer surface of the folded separation membrane, the supply-side flow path material is located in the supply path, and the permeation-side flow path material is located in the permeation path.

In one embodiment of the present specification, the flow path material performs a role of a flow path creating space for raw water inflowing through the supply path or produced water inflowing through the permeation path to flow out.

In one embodiment of the present specification, the supply path can be expressed as a supply spacer or a feed spacer, and can perform a role of maintaining a constant gap between one separation membrane and another separation membrane so as to receive water (raw water) including foreign substances from the outside.

The supply path is preferably formed to minimize blocking the surface of the separation membrane so that the separation membrane effectively filters foreign substances included in raw water.

In one embodiment of the present specification, the permeation path can be expressed as an inner spacer or a permeate spacer, and means space or a path inside one separation membrane folded in half so as to receive produced water filtered by the separation membrane.

In one embodiment of the present specification, the tricot is included in the permeation-side flow path material. The tricot has a fabric or knitted structure, and has a porous surface structure so as to create space for produced water to flow out.

In one embodiment of the present specification, at least a part of the adhering portion means a low-density portion of the tricot.

In one embodiment of the present specification, the low-density portion of the tricot can be included in an area that is 0.5% to 5% based on the total area of the tricot. When the tricot includes the low-density portion in the above-mentioned range, the separation membrane leaf can be stably manufactured by sufficiently enhancing sealability of the adhering portion, and when driving a spiral wound module including the separation membrane leaf, salt rejection performance can be enhanced.

In one embodiment of the present specification, the low-density portion of the tricot can be located at a position where a distance between intersections from one wale passing through the center of the whole area of the tricot to another wale arranged in parallel in a direction of other one or more wales that do not pass through the center is arranged is from 400 nm to 600 mm and preferably from 430 nm to 530 mm, however, the location is not limited thereto. When satisfying the above-mentioned range, the separation membrane leaf can be stably manufactured by sufficiently enhancing sealability of the adhering portion, and when driving a spiral wound module including the separation membrane leaf, salt rejection performance can be enhanced.

In one embodiment of the present specification, the "rest" and the "part other than low-density portion" can be a high-density portion of the tricot.

In one embodiment of the present specification, the "rest" means an area or region included in the adhering portion excluding at least a part of the adhering portion.

In one embodiment of the present specification, the "density" means, when the tricot includes one or more wales and one or more courses, and includes an intersection at which any one of the wales and any one of the courses intersect, a difference in the average distance between two intersections arranged in parallel in a direction that the wale is arranged being relatively close and far, instead of a dictionary meaning of a value obtained by dividing a mass of a material by a volume.

In one embodiment of the present specification, the tricot includes an adhering portion provided in a pair of edge portions facing each other.

The "edge portion" means an end of the tricot.

The "facing" means being arranged side by side, and can mean being arranged in parallel without meeting each other.

In one embodiment of the present specification, the tricot includes one or more wales and one or more courses, the tricot includes an intersection at which any one of the wales and any one of the courses intersect, and an average distance between two intersections arranged in parallel in a direction that the wale of the low-density portion is arranged is 1.25 times or greater of an average distance between two intersections arranged in parallel in a direction that the wale of a part other than the low-density portion is arranged.

The average distance can be preferably greater than or equal to 1.25 times and less than or equal to 20 times, but is not limited thereto. More preferably, the average distance can be greater than or equal to 1.25 times and less than or equal to 2 times, and can be greater than or equal to 1.4 times and less than or equal to 1.6 times.

When the average distance satisfies the above-mentioned range, the separation membrane leaf can be stably manufactured by sufficiently enhancing sealability of the adhering portion, and when driving a spiral wound module including the separation membrane leaf, salt rejection performance can be enhanced.

The "wale" means, in the tricot, a loop line arranged in a length direction corresponding to a warp direction.

The "course" means, in the tricot, a loop line arranged in a width direction corresponding to a weft direction.

The "intersection" means a point at which any one of the wales and any one of the courses intersect, and the tricot can include a plurality of intersections.

The "average distance between two intersections arranged in parallel in a direction of the wale being arranged" means an average distance between two intersections arranged in parallel adjacent in a direction of the wale being arranged.

In one embodiment of the present specification, the tricot can include the wale in greater than or equal to 2 and less than or equal to 3,000, and specifically, in greater than or equal to 1,100 and less than or equal to 2,800 in a direction of the wale being arranged.

In one embodiment of the present specification, the number of the wales included in the tricot can be from 30 to 80 per about 2.54 cm (inch) of the tricot length in a direction of the wale being arranged. Preferably, the number can be from 55 to 65. When the tricot includes the wale in the above-mentioned number range, produced water (fluid passing through the separation membrane) can be stably transferred to a center tube by preventing sinking of the separation membrane during high-pressure driving.

In one embodiment of the present specification, the tricot can include the course in greater than or equal to 2 and less than or equal to 3,000, and specifically, in greater than or equal to 600 and less than or equal to 3,000 in a direction of the course being arranged.

In one embodiment of the present specification, the number of the courses included in the tricot can be from 30 to 65 per about 2.54 cm (inch of the tricot length in a direction that the course is arranged. When the tricot includes the course in the above-mentioned number range, produced water (fluid passing through the separation membrane) can be stably transferred to a center tube by preventing sinking of the separation membrane during high-pressure driving.

In one embodiment of the present specification, the tricot can have a size of a length of 0.5 m to 1.25 m and a width of 1 m based on a case where the spiral wound module has a size of a diameter of about 20.32 cm (8 inches) and a length of about 101.6 cm (40 inches), however, the size is not limited thereto. Specifically, the tricot can have a length of 1 m and a width of 1 m.

The "length" in the present specification means a distance from one end to the other end of the tricot in a direction parallel to the wale, and the "width" in the present specification means a distance from one end to the other end of the tricot in a direction parallel to the course.

In the present specification, the "length direction" means a direction that the course is arranged, and the "width direction" means a direction that the wale is arranged.

In one embodiment of the present specification, the loop refers to including all forms that stitches can have in a fabric forming the tricot of the present specification.

In one embodiment of the present specification, a method for measuring the average distance between two intersections means, based on any one intersection at which any one of the wales and any one of the courses intersect, measuring a distance with an intersection arranged in parallel in a direction that the wale is arranged 10 to 20 times, and then calculating an average value. In addition, it can be measuring a distance with an intersection arranged in parallel in a direction that the wale is arranged twice or more, and then calculating an average value.

In one embodiment of the present specification, the average distance between two intersections of the low-density portion can be from 537 μm to 690 μm. Specifically, the average distance can be from 610 μm to 630 μm. By the low-density portion satisfying the above-mentioned range, the separation membrane leaf can be stably manufactured by sufficiently enhancing sealability of the adhering portion aimed in the present specification while properly maintaining strength of the whole fabric of the tricot, and when driving a spiral wound module including the separation membrane leaf, salt rejection performance can be enhanced.

In one embodiment of the present specification, the average distance between two intersections of a part other than the low-density portion can be from 413 μm to 444 μm. Specifically, the average distance can be from 410 μm to 430 μm. By the part other than the low-density portion satisfying the above-mentioned range, the separation membrane leaf can be stably manufactured by sufficiently enhancing sealability of the adhering portion aimed in the present specification while properly maintaining strength of the whole fabric of the tricot, and when driving a spiral wound module including the separation membrane leaf, salt rejection performance can be enhanced.

In the present specification, a method of including the low-density portion of the adhering portion of the tricot is not particularly limited, and general means known in the art can be employed with limit.

A method for preparing a tricot can be generally divided into a process of preparing a fabric and a process of fixing by heat treatment. In the present specification, the method of including the low-density portion of the tricot is preparing a weaving state of a partial width to lower weaving density to have low weaving density unlike the remaining part other than the partial width based on a width direction of the tricot. The width is based on the description provided above.

In other words, when weaving the tricot, density in at least a part of the adhering portion included in the tricot can be lower than a density of the rest of the tricot.

In the heat treatment process after preparing the fabric, the tricot width can be elongated/shrunk, and in the tricot prepared after the heat treatment, the corresponding part of the partial width having low weaving density is employed to be included in the adhering portion.

In one embodiment of the present specification, the tricot can further include an adhering portion provided in an edge portion that is not parallel to the adhering portion provided in the pair of edge portions facing each other.

In one embodiment of the present specification, the adhering portion provided in the pair of edge portions facing each other of the tricot can mean a first adhering portion.

In one embodiment of the present specification, the adhering portion provided in the non-parallel edge portion can mean a second adhering portion.

The "non-parallel edge portion" means being perpendicular to the pair of edge portions facing each other. The being perpendicular does not necessarily mean an angle of 90 degrees, and the angle can be in a range of 80 degrees to 100 degrees and preferably 85 degrees to 95 degrees, however, the angle is not limited thereto.

In one embodiment of the present specification, the separation membrane included in the separation membrane leaf can mean a water-treatment membrane or a gas separation membrane. The water-treatment membrane can be used as a microfiltration membrane, an ultrafiltration membrane, a nanofiltration membrane, a reverse osmosis membrane or the like, and can be preferably used as a reverse osmosis membrane.

In one embodiment of the present specification, the separation membrane can be a water-treatment membrane.

In one embodiment of the present specification, the separation membrane can be a reverse osmosis membrane.

In another embodiment of the present specification, the separation membrane can be a gas separation membrane.

In one embodiment of the present specification, the separation membrane includes a porous support; and a polyamide active layer provided on the porous support.

When the adhering portion is formed in the separation membrane, the adhering portion is preferably formed on the porous support rather than on the polyamide active layer.

The polyamide active layer can be formed through forming an aqueous solution layer including an amine compound on a porous support; and forming a polyamide active layer on the amine compound-including aqueous solution layer.

As the porous support, those forming a coating layer made of a polymer material on a non-woven fabric can be used. Examples of the polymer material can include polysulfone, polyethersulfone, polycarbonate, polyethylene oxide, polyimide, polyetherimide, polyetheretherketone, polypropylene, polymethylpentene, polymethyl chloride, polyvinylidene fluoride and the like, but are not limited thereto. Specifically, polysulfone can be used as the polymer material. The coating layer can be a polysulfone layer.

As a material of the non-woven fabric, polyethylene terephthalate can be used, however, the material is not limited thereto.

The non-woven fabric can have a thickness of 50 μm to 150 μm, however, the thickness is not limited thereto. The thickness can be preferably from 80 μm to 120 μm. When the non-woven fabric thickness satisfies the above-mentioned range, the separation membrane including the porous support including the non-woven fabric can maintain durability.

The coating layer can have a thickness of 20 μm to 100 μm, however, the thickness is not limited thereto. The thickness can be preferably from 40 μm to 80 μm. When the coating layer thickness satisfies the above-mentioned range, the separation membrane including the porous support including the coating layer can maintain durability.

According to one embodiment, the coating layer can be prepared using a polymer solution including the polysulfone. The polysulfone-including polymer solution can be a homogeneous liquid obtained by introducing 10% by weight to 20% by weight of a polysulfone solid to 80% by weight to 90% by weight of a dimethylformamide solvent based on the total weight of the polysulfone-including polymer solution, and dissolving the solid for 12 hours at 80° C. to 85° C., however, the weight range is not limited to the above-mentioned range.

When the polysulfone solid is included in the above-mentioned range based on the total weight of the polysulfone-including polymer solution, the separation membrane including the porous support including the coating layer can maintain durability.

The coating layer can be formed using a method of casting. The casting means a solution casting method, and specifically, can mean a method of dissolving the polymer material in a solvent, developing the solution on a smooth surface with no adhesive property, and then substituting the solvent. Specifically, the method of substituting the solvent can use a nonsolvent induced phase separation method. The nonsolvent induced phase separation method is a method in which a polymer is dissolved in a solvent to form a homogeneous solution, and after forming the solution to a certain form, this is dipped in a nonsolvent. After that, exchange occurs by the diffusion of the nonsolvent and the solvent changing the composition of the polymer solution, and as the polymer precipitates, the part occupied by the solvent and the nonsolvent is formed into a pore.

The polyamide active layer can be formed by producing polyamide by interfacial polymerization while an amine compound and an acyl halide compound react when the amine compound and the acyl halide compound are in contact with each other, and the polyamide being adsorbed on the microporous support. The contact can be made through methods such as dipping, spraying or coating. As a condition for the interfacial polymerization, those known in the art can be used without limit.

In order to form the polyamide active layer, an aqueous solution layer including an amine compound can be formed on the porous support. A method for forming the amine compound-including aqueous solution layer on the porous support is not particularly limited, and methods capable of forming an aqueous solution layer on the porous support layer can be used without limit. Specifically, a method for forming the amine compound-including aqueous solution layer on the porous support can include spraying, coating, dipping, dropping or the like.

Herein, the aqueous solution layer can further go through removing an excess amine compound-including aqueous solution as necessary. The aqueous solution layer formed on the porous support can be non-uniformly distributed when there are too much of the aqueous solution present on the porous support, and when the aqueous solution is non-uniformly distributed, a non-uniform polyamide active layer can be formed by subsequent interfacial polymerization. Accordingly, the excess aqueous solution is preferably removed after forming the aqueous solution layer on the porous support. A method of removing the excess aqueous solution is not particularly limited, however, methods using a sponge, an air knife, nitrogen gas blowing, natural drying, a compression roll or the like can be used.

In the amine compound-including aqueous solution, the amine compound is not limited in the type as long as it is an amine compound used in separation membrane manufacturing, however, specific examples thereof can preferably include m-phenylenediamine, p-phenylenediamine, 1,3,6-benzene-triamine, 4-chloro-1,3-phenylenediamine, 6-chloro-1,3-phenylenediamine, 3-chloro-1,4-phenylenediamine or mixtures thereof.

A solvent of the amine compound-including aqueous solution can be water, and in addition thereto, acetone, dimethyl sulfoxide (DMSO), 1-methyl-2-pyrrolidinone (NMP) or hexamethylphosphoramide (HMPA) can be included.

The amine compound content can be greater than or equal to 1% by weight and less than or equal to 10% by weight with respect to the total weight of the composition. When satisfying the above-mentioned content, salt rejection and flux aimed in the present disclosure can be secured.

The polyamide active layer can be prepared by coating the amine compound-including aqueous solution on the porous support, and then bringing an organic solution including an acyl halide compound into contact therewith, and interfacial polymerizing the result.

The acyl halide compound is not limited as long as it can be used in polyamide polymerization, however, specific examples thereof can preferably include, as an aromatic compound having 2 to 3 carboxylic acid halides, one type selected from the compound group consisting of trimesoyl chloride, isophthaloyl chloride and terephthaloyl chloride, or a mixture of two or more types thereof.

The acyl halide compound content can be greater than or equal to 0.01% by weight and less than or equal to 0.5% by weight with respect to the total weight of the composition. When satisfying the above-mentioned content, salt rejection and flux aimed in the present disclosure can be secured.

Examples of an organic solvent that can be included in the organic solution including an acyl halide compound, are freons, an aliphatic hydrocarbon solvent having 5 to 12 carbon atoms, for example, hexane, cyclohexane and heptane, hydrophobic liquids that are not mixed with water such as alkane, for example, alkane having 5 to 12 carbon atoms, and a mixture thereof that is IsoPar (Exxon), ISOL-C(SK Chem), ISOL-G (Exxon) and the like can be used, however, the organic solvent is not limited thereto.

The organic solvent content can be from 95% by weight to 99.99% by weight with respect to the total weight of the acyl halide compound-including organic solution, however, the content is not limited thereto. When satisfying the above-mentioned content, salt rejection and flux aimed in the present disclosure can be secured.

The polyamide active layer can have a thickness of 10 nm to 1000 nm, however, the thickness is not limited thereto. The thickness can be preferably from 300 nm to 500 nm. When the polyamide active layer satisfies the above-mentioned range, salt rejection and flux aimed in the present disclosure can be secured.

In one embodiment of the present specification, the spiral wound module including the separation membrane leaf includes a center tube.

In one embodiment of the present specification, the separation membrane leaf includes a separation membrane including a part folded in half, and the part folded in half can be provided with an adhering portion.

In one embodiment of the present specification, the adhering portion can be a part in which an outer surface of the separation membrane folded in half and the permeation-side flow path material including the tricot adhere.

In the part in which an outer surface of the separation membrane folded in half and the permeation-side flow path material including the tricot adhere, the outer surface of the separation membrane means a porous support surface rather than a polyamide active layer surface.

In one embodiment of the present specification, an adhesive material used in the adhering portion is not particularly limited, and general means known in the art can be used without limit. For example, a urethane-based adhesive, an epoxy-based adhesive or an acetate-based adhesive can be used, however, the adhesive material is not limited thereto.

In the separation membrane leaf provided in one embodiment of the present specification, the tricot has a thickness of about 0.18 mm (7 milli-inches) to about 0.33 mm (13 milli-inches). When the thickness is about 0.18 mm (7 milli-inches) or less, flow of produced water can be inhibited, and when the thickness is about 0.33 mm (13 milli-inches) or greater, the amount of the separation membrane introduced to a spiral wound module can decrease.

One embodiment of the present specification provides a spiral wound module including the separation membrane leaf.

Examples of the module can include a plate & frame module, a tubular module, a hollow & fiber module, a spiral wound module or the like, however, a spiral wound module is preferred in the present specification.

The spiral wound module of the present specification is not particularly limited in other constitutions and manufacturing methods as long as it includes the separation membrane leaf described above, and general means known in the art can be employed without limit.

As one example, the separation membrane leaf can be manufactured to the spiral wound module by being wound in a roll type around the center tube with a membrane area of 370 ft$^2$ to 400 ft$^2$, however, the method is not limited thereto.

In one embodiment of the present specification, the spiral wound module can include one or more of the separation membrane leaves. Specifically, 1 to 100 separation membrane leaves can be included, and preferably 1 to 50 separation membrane leaves can be included. More specifically, when the spiral wound module size is about 20.32 cm (8 inches) in the diameter and about 101.6 cm (40 inches) in the length, 20 to 30 of the separation membrane leaves can be included. When the spiral wound module includes the separation membrane leaf in the above-mentioned range, a proper effective area can be secured.

In one embodiment of the present specification, the spiral wound module includes a center tube, the tricot includes an edge portion connected to the center tube, a pair of edge portions facing each other except the edge portion connected to the center tube include the adhering portion, and the separation membrane leaf is wound around an outer side of the center tube.

The separation membrane leaf being wound around an outer side of the center tube can mean being wound.

In one embodiment of the present specification, the tricot can further include an adhering portion in an edge portion not parallel to the pair of edge portions facing each other except the edge portion connected to the center tube.

The edge portion not parallel to the pair of edge portions facing each other except the edge portion connected to the center tube can mean a region where the tricot touches the folded part of the folded separation membrane.

The center tube can be expressed as a tube, and the center tube performs a role of a path through which filtered produced water (purified water) is inflowing and then outflowing.

A shape of the center tube is not particularly limited, but is preferably located at the center of the spiral wound module. In addition, the center tube can have one side surface open so that the produced water is outflowing.

In one embodiment of the present specification, the center tube can include a plurality of pores, and when water treatment progresses by the spiral wound module according to one embodiment of the present specification, produced water is inflowing into the center tube through the plurality of pores of the center tube, and then the inflowing produced water is outflowing through the open one side surface of the center tube.

A material of the center tube is not particularly limited, and general materials known in the art can be used.

In one embodiment of the present specification, the spiral wound module includes the adhering portion included in the pair of edge portions facing each other except the edge portion connected to the center tube of the tricot in a ratio (%) of 1 to 10 with respect to the total length of the center tube. Specifically, the ratio (%) can be from 1 to 8.

By the adhering portion being provided in a ratio (%) of 1 to 10 with respect to the total length of the center tube, raw water and purified water are not mixed, which can enhance salt rejection of the spiral wound module. When the adhering portion is included in less than a ratio (%) of 1 with respect to the total length of the center tube, unpurified raw water can be inflowing due to breakage of the adhering portion, and when the ratio (%) is greater than 10, the part capable of purifying raw water (effective area) is small, and raw water may not be effectively purified.

In one embodiment of the present specification, the spiral wound module has average salt rejection of 99.88% to 99.95% under a condition of a 32,000 ppm aqueous sodium chloride solution, 25° C. and 800 psi. The average salt rejection can be specifically from 99.89% to 99.9%.

In one embodiment of the present specification, the spiral wound module has average flux of 5,000 GFD to 20,000 GPD based on a spiral wound module having a diameter of about 20.32 cm (8 inches) and a length of about 101.6 cm (40 inches) under a condition of 25° C. and 800 psi using a 32,000 ppm aqueous sodium chloride solution. The average flux can be specifically from 8,000 GFD to 8,500 GPD.

The GPD means gallon/day.

One embodiment of the present specification provides an apparatus including one or more of the spiral wound modules.

The apparatus is not particularly limited in other constitutions, manufacturing methods and the like as long as it includes the spiral wound module described above, and general means known in the art can be employed without limit. Specifically, the apparatus can mean a water-treatment apparatus.

FIG. 1 illustrates a separation membrane leaf according to one embodiment of the present specification. The separation membrane leaf includes a folded separation membrane (10), a supply-side flow path material (21) and a permeation-side flow path material (31). A supply path (20) is formed on an inner surface of the folded separation membrane (10), and a permeation path (30) is formed on an outer surface thereof. The supply path (20) includes the supply-side flow path material (21), and the permeation path (30) includes the permeation-side flow path material (31). Raw water is purified through the separation membrane (10) after passing through the supply-side flow path material (21) included in the supply path (20), and purified produced water is effectively inflowing to a center tube through the permeation-side flow path material (31) after passing through the permeation path (30) and is collected therein.

FIG. 2 is a perspective view of the separation membrane leaf according to one embodiment of the present specification. The tricot included in the permeation-side flow path material (31) included in the separation membrane leaf is provided with an adhering portion (1) in one of the pair of edge portions facing each other. In the present specification, sealability of the adhering portion (1) provided in the tricot is enhanced allowing stable driving of a spiral wound module, and effects of enhancing salt rejection and flux performance are obtained.

FIG. 3 illustrates a tricot according to one embodiment of the present specification. Specifically, the tricot (50) includes an adhering portion (1) provided in a pair of edge portions (1-3) facing each other. At least a part (2) of the adhering portion (1) provided in the tricot (50) is a low-density portion having lower density than the rest (3). The tricot further includes an adhering portion in an edge portion (1-2) not parallel to the pair of edge portions (1-3) facing each other except the edge portion connected to the center tube (40).

FIG. 4 illustrates a tricot that does not include the adhering portion according to one embodiment of the present specification. The tricot can have a thickness (T) of about 0.18 mm (7 milli-inches) to about 0.33 mm (13 milli-inches). A course is arranged in a length direction (51) of the tricot, and a wale is arranged in a width direction (52) of the tricot.

FIG. 5 illustrates a tricot according to a comparative example. The tricot used as a comparative example has the same density in the whole area.

FIG. 6 illustrates a separation membrane according to one embodiment of the present specification. Specifically, FIG. 6 illustrates a separation membrane in which a porous support (101) including a non-woven fabric (100) and a coating layer (200), and a polyamide active layer (300) are consecutively provided. Raw water (400) is inflowing to the polyamide active layer (300), produced water (500) is outflowing through the non-woven fabric (100), and concentrated water (600) is outflowing to the outside failing to pass the polyamide active layer (300).

FIG. 7 illustrates a spiral wound module according to one embodiment of the present specification. Specifically, the spiral wound module is formed including a center tube (40), a supply path (20), a separation membrane (10), a permeation path (30) and the like. The separation membrane (10)

is folded in half. When flowing raw water to the spiral wound module, raw water is inflowing through the supply path (20) in the spiral wound module. One or more of the separation membranes (10) are extended in an outer side direction from the center tube (40), and wound around the center tube (40). The supply path (20) forms a path through which raw water is inflowing from the outside, and performs a role of maintaining a gap between one separation membrane (10) and another separation membrane. For this, the supply path (20) is in contact with the one or more separation membranes (10) on the upper side and the lower side, and wound around the center tube (40). The supply path (20) includes a supply-side flow path material. The permeation path (30) is located between the folded separation membrane (10) and performs a role of forming a flow path of produced water purified from the separation membrane (10). The permeation path (30) includes a permeation-side flow path material. The permeation-side flow path material includes a tricot. The tricot generally has a fabric-type structure, and performs a role of a flow path creating space through which water purified through the separation membrane (10) flows. The center tube (40) is located at the center of the spiral wound module, and performs a role of a path through which purified water is inflowing and then outflowing. Herein, it is preferred to form a pore having a certain size on the outer side of the center tube (40) so as to introduce filtered water, and it is preferred to form one or more pores.

FIG. 8 shows a sample picture of a tricot used in the present specification, and in the tricot, density of a part having a relatively large loop is lower than a part having a small loop.

FIG. 9 is a graph showing an I-MR control chart of spiral wound modules according to an example and a comparative example. The I-MR control chart is one type of control chart classified by Minitab, and the I-MR control chart can be used to monitor process average and fluctuation when there are variables data, an individual observation not included in a subgroup. In other words, the I-MR control chart can be used to identify and correct instability of a process by monitoring stability of the process over time. In FIG. 9, the number on the Y axis means salt rejection. In addition, the new technology means a value according to one embodiment of the present disclosure, and an existing technology means a value according to a comparative example.

FIG. 10 shows a sample picture of a tricot including one or more wales and one or more courses, and having a constant average distance between intersections arranged in parallel in the direction that the wale is arranged.

FIG. 11 shows a sample picture of a tricot including a low-density portion. In the tricot sample picture, a low-density portion (L) means a region having lower density compared to a high-density portion (H). The low-density portion (L) means that an average distance between two intersections arranged in parallel in the direction that the wale is arranged is 1.25 times or greater of an average distance between two intersections arranged in parallel in the direction that the wale of a part other than the low-density portion is arranged.

FIG. 12 shows a sample picture of a tricot measuring and describing a distance between two intersections arranged in parallel in a direction that the wale of a part other than the low-density portion is arranged. The part other than the low-density portion can mean a high-density portion, and an average distance between two intersections arranged in parallel in a direction that the wale of a part other than the low-density portion is arranged is from 413 µm to 444 µm.

FIG. 13 shows a sample picture of a tricot measuring and describing a distance between two intersections arranged in parallel in a direction that the wale of the low-density portion is arranged. An average distance between two intersections arranged in parallel in a direction that the wale of the low-density portion is arranged is from 537 µm to 690 µm.

FIG. 14 illustrates one or more wales and one or more courses included in the tricot, and an intersection (C) at which any one of the wales (A) and any one of the courses (B) intersect. An average distance (D1) between two intersections arranged in parallel in a direction that the wale (A) of the low-density portion is arranged is 1.25 times or greater of an average distance (D2) between two intersections arranged in parallel in a direction that the wale (A) of a part other than the low-density portion is arranged.

EXAMPLES

Hereinafter, the present specification will be described in detail with reference to examples in order to specifically describe the present specification. However, examples according to the present specification can be modified to various different forms, and the scope of the present specification is not construed as being limited to the examples described below. The examples of the present specification are provided in order to more fully describe the present specification to those having average knowledge in the art.

Preparation Example

Example (Preparation of Tricot)

A tricot was woven and then heat treated to prepare a tricot having a width of 1 m and a length of 1 m.

Specifically, a tricot was woven so as to locally include a low-density portion by having a distance between intersections from one wale passing through the center of the whole area of the tricot to another wale arranged in parallel in a direction of other one or more wales that do not pass through the center to be 480 mm apart, and employing an average distance between intersections of the wales and the courses included in the tricot to be from 610 µm to 630 µm in the 1% area based on the total area of the tricot.

An average distance between two intersections of the wales and the courses of a part other than the low-density portion of the tricot was from 410 µm to 430 µm.

In other words, in the prepared tricot, an average distance between two intersections arranged in parallel in a direction that the wale of the low-density portion is arranged was greater than or equal to 1.4 times and less than or equal to 1.6 times of an average distance between two intersections arranged in parallel in a direction that the wale of a part other than the low-density portion is arranged.

(Manufacture of Separation Membrane Leaf)

As a porous support, a coating layer (polysulfone layer) was coated to a thickness of 60 µm on a non-woven fabric (polyethylene terephthalate) having a thickness of 100 µm. The coating solution of the polysulfone layer was a homogeneous liquid obtained by introducing 15% by weight of a polysulfone solid to 85% by weight of a dimethylformamide solvent and stirring the result for 12 hours at 80° C. to 85° C. As a coating method, a die coating method was used.

After that, a polyamide active layer was formed on the porous support using an interfacial polymerization reaction of m-phenylenediamine (m-PD) and trimesoyl chloride (TMC).

Specifically, an aqueous solution layer was formed on the porous support layer using an aqueous solution including 5% by weight of m-phenylenediamine. Then, an organic solution including 0.2% by weight of trimesoyl chloride (TMC) and 98% by weight of Isopar-G, an organic solvent, was coated on the aqueous solution layer, and the result went through an interfacial polymerization reaction to prepare a polyamide active layer having a thickness of 500 nm.

As a result, a separation membrane including a porous support and a polyamide active layer provided on the porous support was manufactured.

The prepared separation membrane was folded in half, a supply-side flow path material was located on an inner surface of the folded separation membrane, and a permeation-side flow path material including the tricot was located on an outer surface of the folded separation membrane.

Then, based on a length direction of the center tube to be included in a spiral wound module, a two component-type polyurethane adhesive was coated in a ratio (%) of 2.5 with respect to the total length of the center tube from parallel both ends of the tricot, and then the separation membrane, the supply-side flow path material and the permeation-side flow path material were bonded to manufacture a separation membrane leaf.

(Manufacture of Spiral Wound Module)

A spiral wound module was manufactured using the separation membrane leaf. The separation membrane leaf was wound around the center tube in a roll type to manufacture 50 spiral wound modules having a membrane area of 400 ft$^2$.

Comparative Example 50 separation membrane leaves and spiral wound modules were prepared in the same manner as in the example except that, in the method for preparing the tricot of the example, a tricot that did not go through a process of weaving to locally include a low-density portion in the tricot and has constant density in the whole area was used.

In the tricot that did not go through a process of weaving to locally include a low-density portion, an average distance between intersections of the wales and the courses was from 410 μm to 430 μm in the whole tricot area.

Experimental Example (Evaluation of Salt Rejection)

For each of the 50 spiral wound modules manufactured according to the example and the comparative example, performance of the 50 spiral wound modules was evaluated under a condition of 25° C. and 800 psi using a 32,000 ppm aqueous sodium chloride solution. Salt rejection was measured by measuring a difference in the conductivity of raw water and conductivity of produced water, and a minimum value, an average value and a standard deviation thereof are shown in the following Table 1. In addition, a salt rejection value of each of the spiral wound modules is shown in a graph in FIG. 9.

TABLE 1

|  | Minimum Salt Rejection (%) | Average Salt Rejection (%) | Standard Deviation |
| --- | --- | --- | --- |
| Example | 99.86 | 99.89 | 0.009 |
| Comparative Example | 99.78 | 99.87 | 0.025 |

According to Table 1, it was identified that minimum salt rejection of the example was higher than minimum salt rejection of the comparative example. In addition, it was also identified that the example had higher average salt rejection than the comparative example. In the standard deviation, it was also identified that the example had a smaller value than the comparative example.

Moreover, when referring to the I-MR control chart shown in FIG. 9, the salt rejection value according to the example was uniformly distributed compared to the value of the comparative example, and it was identified that the spiral wound module according to one embodiment of the present specification can be stably driven.

Hereinbefore, preferred embodiments of the present disclosure have been described, however, the present disclosure is not limited thereto, and various modifications can be made in the scope of the claims and the detailed descriptions of the disclosure, and these also fall within the category of the disclosure.

REFERENCE NUMERALS

1: Adhering Portion
1-2: Edge Portion Not Parallel to Adhering Portion Provided in Pair of Edge Portions Facing Each Other
1-3: Adhering Portion of One Side Part of Pair of Edge Portions Facing Each Other of Tricot
2: At Least Part of Adhering Portion (1) (=Low-Density Portion)
3: Part Other Than Low-Density Portion of Adhering Portion (=High-Density Portion)
10: Separation Membrane
20: Supply Path
21: Supply-Side Flow Path Material
30: Permeation Path
31: Permeation-Side Flow Path Material
40: Center Tube
41: Length Direction of Center Tube
50: Tricot
50-1: Tricot Not Including Adhering Portion
51: Tricot Length Direction
52: Tricot Width Direction
T: Tricot Thickness
100: Non-Woven Fabric
101: Porous Support
200: Coating Layer
300: Polyamide Active Layer
400: Raw Water
500: Produced Water
600: Concentrated Water
L: Low-Density Portion of Tricot
H: High-Density Portion of Tricot
A: Wale
B: Course
C: Intersection at Which Wale and Course Intersect
D1: Average Distance between Two Intersections Arranged in Parallel in Direction of the Wale (A) of Low-Density Portion Being Arranged
D2: Average Distance (D2) between Two Intersections Arranged in Parallel in Direction of The Wale (A) of Part Other Than the Low-Density Portion Being Arranged

The invention claimed is:

1. A separation membrane leaf, comprising:
a separation membrane;
a supply-side flow path material; and
a permeation-side flow path material, wherein the permeation-side flow path material includes a tricot;

the tricot includes one or more wales and one or more courses;

the tricot includes an intersection at which any one of the one or more wales and any one of the one or more courses intersect;

the tricot includes a first adhering portion provided in a pair of parallel first and second edge portions where at least a part of the first adhering portion includes a low-weaving-density portion of the tricot compared to a rest of the tricot that has a high-weaving density, and the first adhering portion includes a high-weaving-density portion having the high-weaving density as the rest of the tricot other than the low-weaving-density portion on an outside edge of the tricot, and the high-weaving-density portion is adjacent to one side of the low-weaving-density portion which is in an interior of the first adhering portion;

the first adhering portion includes an average distance between two intersections arranged in parallel in a direction in which the one or more wales of the low-weaving-density portion is arranged is 1.25 times or greater than an average distance between two intersections arranged in parallel in a direction in which the one or more wales of the high-weaving-density portion is arranged, wherein an area of the low-weaving-density portion of the tricot is 0.5% to 5% based on a total area of the tricot; and the tricot includes a second adhering portion provided in a third edge portion not parallel to the first adhering portion, wherein bubbles generated in a manufacturing process of the separation membrane leaf can move from a tricot space of the high-weaving-density portion of the first adhering portion and be disposed in the interior low-weaving-density portion of the first adhering portion, thereby enhancing sealability of the first adhering portion because the tricot space of the high-weaving-density portion on the outside edge of the first adhering portion is filled with an adhesive.

2. The separation membrane leaf of claim 1, wherein the tricot has a thickness of about 0.18 mm (7 milli-inches) to about 0.33 mm (13 milli-inches).

3. A spiral wound module comprising the separation membrane leaf of claim 1.

4. The spiral wound module of claim 3 further comprising a center tube,
wherein the third edge portion of the tricot is connected to the center tube by the second adhering portion; and
the separation membrane leaf is wound around an outer side of the center tube.

5. The spiral wound module of claim 4, wherein a ratio (%) of a length of the first adhering portion provided in the pair of parallel first and second edge portions with respect to a total length of the center tube is 1 to 10.

6. An apparatus comprising one or more of the spiral wound modules of claim 3.

7. The separation membrane leaf of claim 1, wherein an average distance between two intersections of the one or more wales and the one or more courses included in the low-weaving-density portion of the tricot is from 537 μm to 690 μm.

8. The separation membrane leaf of claim 1, wherein an average distance between two intersections of the one or more wales and the one or more courses in the high-weaving-density portion is from 410 μm to 444 μm.

* * * * *